United States Patent [19]
Gottlieb et al.

[11] 3,829,145
[45] Aug. 13, 1974

[54] SPREADER BAR EXTENSION

[75] Inventors: Carl R. Gottlieb; Robert N. Campbell, Jr., both of Mobile, Ala.

[73] Assignee: Sea-Land Service, Inc., Elizabeth, N.J.

[22] Filed: July 22, 1969

[21] Appl. No.: 843,557

[52] U.S. Cl............................ 294/81 SF, 294/67 R
[51] Int. Cl............................................. B66c 1/66
[58] Field of Search.. 294/67 R, 67 B, 67 D, 67 DB, 294/81 R, 81 SF; 212/125

[56] References Cited
UNITED STATES PATENTS

| | | | |
|---|---|---|---|
| 3,257,142 | 6/1966 | Barry | 294/81 |
| 3,453,017 | 7/1969 | Nagy | 294/67 |
| 3,493,258 | 2/1970 | Wyrough | 294/67 |

*Primary Examiner*—Evon C. Blunk
*Assistant Examiner*—Johnny D. Cherry

[57] ABSTRACT

A spreader bar extension for increasing the effective length of a crane-carried lifting spreader bar used for transferring large, bulky, unitary loads mounted on supports such as flat-bed containers, the extension comprising a generally rectangular framework having flared guides at the upper and lower ends thereof for aligning the framework with a spreader bar and a load respectively. Locking lugs positioned on the framework are releasably coupled to the spreader bar locking lugs for operation therewith.

10 Claims, 9 Drawing Figures

INVENTOR
ROBERT N. CAMPBELL, JR.
CARL R. GOTTLIEB

BY attorney

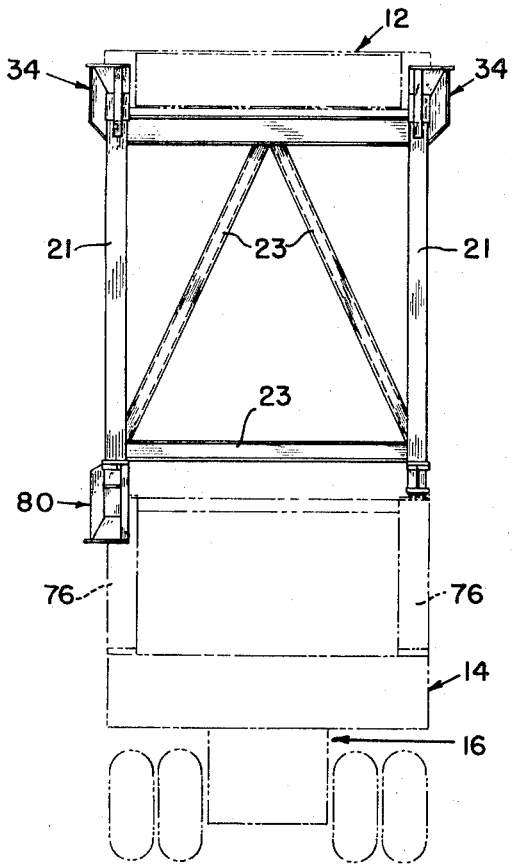
FIG. 3
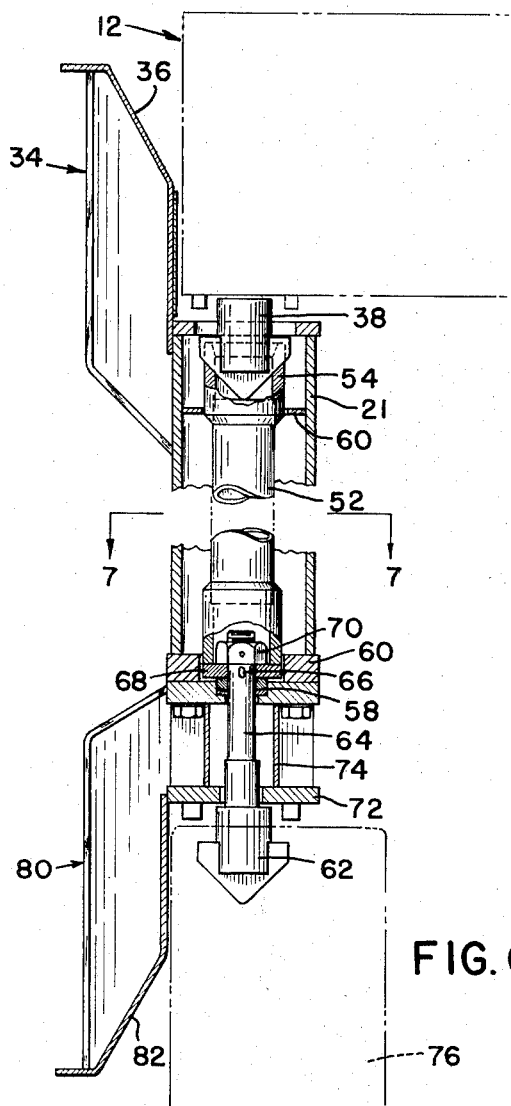
FIG. 6
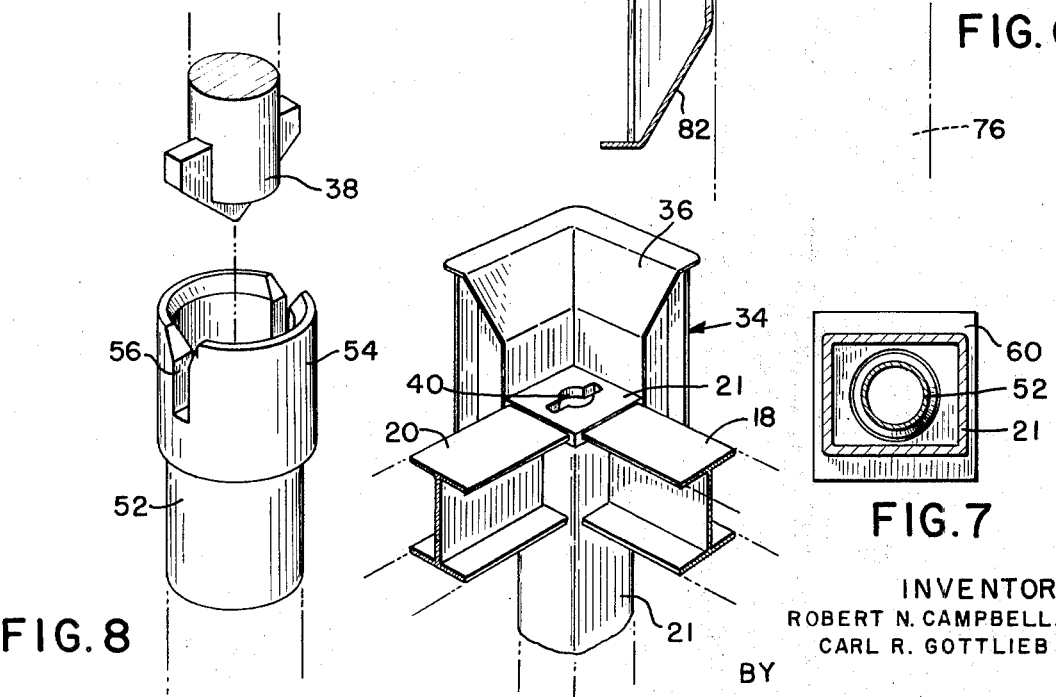
FIG. 8
FIG. 9
FIG. 7
INVENTOR.
ROBERT N. CAMPBELL, JR.
CARL R. GOTTLIEB
BY
attorney

SPREADER BAR EXTENSION

BACKGROUND, BRIEF SUMMARY, AND OBJECTS OF THE INVENTION

This invention relates to the handling of freight in transit and more specifically to a gantry crane in combination with a spreader bar and spreader bar extension for lifting and lowering large, bulky, unitary loads, mounted on flat-bed containers, between a ship and land vehicles positioned at dockside.

In the transportation of freight involving successive land and water movement, it is economical to employ highway trucks for operation between inland terminals and seaports in combination with ships for operation between ports. Containers which are detachable from truck trailer chassis and transferred between ships and land vehicles provide an efficient means for transferring the freight. Devices are provided at the corners of the containers for receiving coupling connections secured to the spreader bar framework. Spreader bars are utilized for making quick and effective connection to and disconnection from the containers as they are transferred between the hold or deck of a ship and a land vehicle. The conventional spreader is analogous to that disclosed in U.S. Pat. No. 3,042,227 and is designed to span the length of the container and make reliable and efficient connections to the container during movement of a gantry crane supporting the spreader bar.

Guide devices are provided on the spreader which causes the spreader to become aligned with the container to permit load coupling connections to be made rapidly and reliably. The guides are movable in that they can be retracted once the container has been secured to the spreader bar so that portions of the guides will not interfere with the ship or vehicle walls during transfer or storage of the container. The guides comprise tapered plates which extend downwardly in the load engaging position for aligning the spreader framework with the container. As the spreader framework is lowered, the guide plates urge the load connecting devices mounted at each corner thereof, into registry with mating connection devices at the corner of the container. A spreader bar having guides of this type is adequate to become coupled with and transfer the box-type containers wherein the spreader load connecting devices are received within the load connecting devices positioned at the uppermost corners of the container.

Where bulky loads, such as busses or large pieces of machinery, are secured upon a support or flat-bed container having no top or side walls, conventional spreader bars are inadequate to engage the load-engaging devices of the topless containers or supports since the uppermost portion of the large loads oftentimes extends vertically above such load connecting devices and prevents coupling of the spreader bar and the load. Since the spreader framework load connecting devices do not extend below the framework a substantial amount, it can be seen that the conventional spreader bar could conceivably engage the large load before engagement of the load connecting devices.

The present invention is specifically directed to a spreader bar extension having guides at the upper and lower ends thereof, adapted to be releasably coupled with a conventional spreader bar and a load. The spreader extension comprises an elongated framework releasably secured to the spreader bar having a load-coupling connector at the lowermost end portion of each of a plurality of vertically depending posts. The posts are of a length suitable to engage the upper ends of an open flat-bed container or support platform having connector devices mounted thereon, without interfering with a load secured upon the support platform. Positioned within each of the vertical corner posts is an elongated tubular member having a locking lug at the lower end and a fitting at the upper end for releasably receiving the locking lugs secured to a conventional spreader bar. Upon twisting movement of the spreader locking lugs, the tubular members and spreader bar extension lower locking lugs are rotated to lockingly engage the connector devices of a flat-bed container.

Guides secured to the lower portion of the depending posts of the spreader extension includes tapered plates to receive a section of the open container or platform loosely within the plates to align the spreader bar and spreader bar extension and the load coupling connector lugs with the connector devices of the platform. Upper tapered guide plates are secured to the upper end of each of the four extension spreader posts for aligning the spreader bar and the spreader bar extension before they are coupled together.

With the foregoing in mind, it is a primary object of the present invention to provide a structural improvement in spreader bars which will permit reliable and efficient as well as rapid and secure connections to supports or flat-bed containers having large, bulky loads secured thereon.

Another object of the invention is to provide guides for the spreader extension for alignment with the spreader framework and with load securing and lifting devices positioned on the flat-bed container.

Still another object is to provide a spreader bar extension which may be conveniently and rapidly releasably coupled to existing spreader bar equipment.

These and other objects and advantages of the present invention will become apparent from the following detailed description of the preferred embodiment taken in conjunction with the accompanying drawings.

BRIEF DESCRIPTION OF THE FIGURES

FIG. 3 is an end view of the spreader bar extension illustrating the guide means at the upper and lower ends thereof and positioned above a trailer chassis mounted flat-bed container;

FIG. 6 is an enlarged view of the corner post illustrating the upper and lower tapered guide plates and illustrating the details of a tubular member interconnecting the spreader bar and spreader bar extension load lifting lugs;

FIG. 7 is a cross-sectional view of a corner post and tubular member taken along lines 7—7 of FIG. 6;

FIG. 8 is an enlarged view of the upper end of the rotatable tubular member and illustrating the manner in which the member receives a spreader bar load lifting lug; and FIG. 9 is an enlarged view of an upper corner of the spreader bar extension showing the tapered guide plates and the opening for releasably receiving a spreader bar lifting lug.

DETAILED DESCRIPTION OF THE INVENTION

Figure 1:
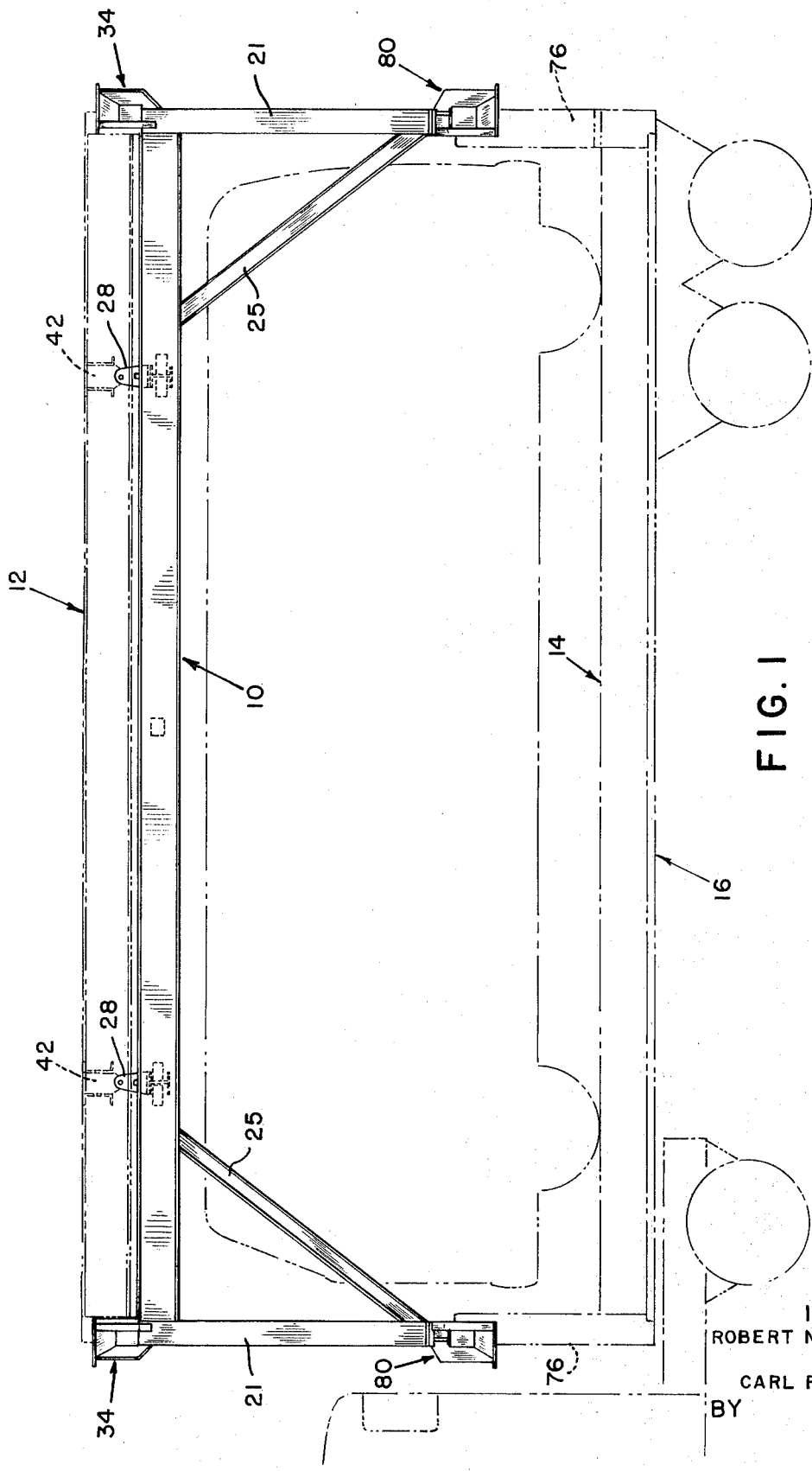
FIG. 1 is a side elevational view of the spreader bar extension coupled to a conventional spreader bar and secured to a platform container mounted on a truck trailer chassis having a bus positioned thereon.
Figure 2:
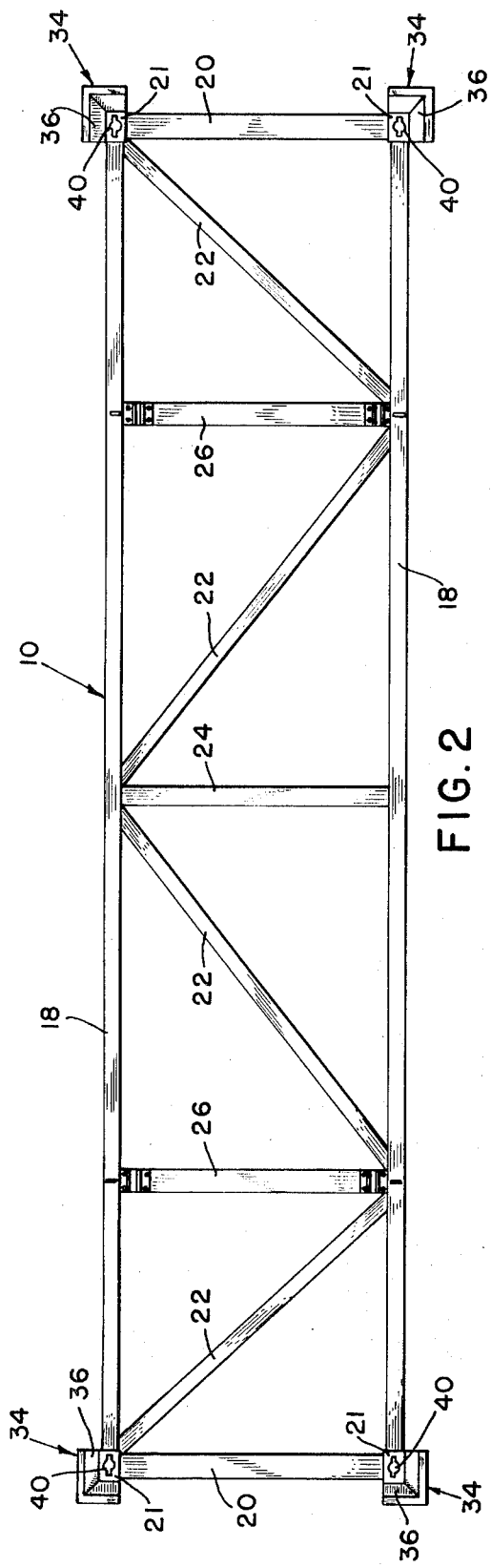
FIG. 2 is a top plan view of the spreader bar extension.

Referring now to the drawing and particularly to FIG. 1, a spreader bar extension shown generally as 10 is supported by a conventional spreader bar 12 commonly suspended from a gantry crane, not shown, and is positioned in engagement with a flat-bed container 14 detachably secured to a highway truck trailer chassis 16.

The spreader bar extension 10 comprises a rectangular upper framework of substantially the dimensions of a conventional spreader bar and the plan dimensions of a container body, composed of a pair of longitudinal members 18 and cross members 20 connected at their ends to corner posts 21, braced by diagonal tie means 22 and normal tie means 24, 26. Tie means 23 and 26 secure the corner posts 21 to the spreader bar extension rectangular frame adjacent the ends thereof. At each end of the normal tie means 26, adjacent the longitudinal members 18, substantially U-shaped brackets 28 are secured thereto by bolts 30. Openings are formed in the brackets 28 for receiving a pin 32 to connect the spreader extension to a conventional spreader bar 12. Guides 34 positioned at each corner of a rectangular frame, and secured to posts 21, comprise outwardly and upwardly flared and tapered plates 36 designed for contiguous relationship with the corners of spreader bar 12.

The spreader bar 12, portions of which have been shown in FIGS. 1 and 3-6, comprises a generally rectangular frame substantially corresponding in size to the spreader extension rectangular frame, formed by members 18, 20. The spreader bar 12 is provided with a number of twist locks 38 located at each corner which are rotated approximately 90° by a linkage in a conventional manner. The twist locks 38 are received within apertures 40 formed in the upper ends of posts 21 forming the corners of the spreader extension 10.

The flared plates 36 facilitate registry between the twist locks 38 and the apertures 40 as the spreader 12 is lowered to and coupled with the spreader extension 10.

Figure 5:
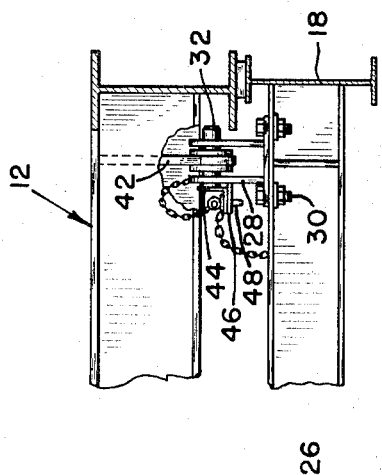
FIG. 5 is an end view of the locking means of FIG. 4.
Figure 4:
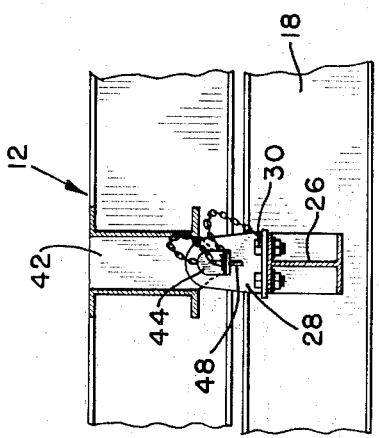
FIG. 4 is an enlarged view of one of the locking means for suspending the extension below the spreader bar.

A number of depending flanges 42, having openings therein for receiving a locking pin 32, are secured to spreader 12 so as to be in alignment with and received between the U-shaped brackets 28 of spreader extension 10. In this manner the spreader bar extension 10 is suspended below the spreader bar 12 by pins 32 interlocking brackets 28 and depending flanges 42 of the extension and spreader bar, respectively. Secured to one end of each pin 32 is an L-shaped plate 44 having the base thereof resting upon a flange 46 extending normal to one leg of U-shaped brackets 28. When pin 32 is lockingly engaging the spreader bar and spreader bar extension, as shown by FIGS. 4, 5, apertures, not shown, in each of plate 44 and flange 46, are properly aligned for receiving a pin 48 which maintains pin 32 in locked position. The pin 48 is secured by a chain 50 or other suitable flexible means to the spreader bar extension 10.

In each corner post 21, a tubular member 52 having an enlarged upper end 54 is provided with a slot 56 for receiving a locking lug 38 secured to the spreader bar 12. The tubular member 52, rotatably supported within guides 60 upon bearing 58, has secured to the lower end thereof a locking lug 62. The locking lug 62 is secured to a shaft 64 which is keyed at 66 to plate 68 for rotation with tubular member 52. A nut 70 threadably received on one end of shaft 64 and plate 72, having an oversized opening therein for receiving shaft 64, spaced by members 74 below tubular member 52 limit axial movement of the locking lug 62. Thus it can be seen that rotation of the spreader bar lifting lug 38 results in a corresponding rotation of the locking lug 62 positioned on the spreader bar extension. The spreader bar locking lugs 62, provided below each corner post 21, are received within conventional load lifting openings, not shown, provided in the upper ends of the flatbed container corner post 76.

Downwardly opening guides 80 having tapered plates 82, similar to those of upper guides 34, are secured to a number of corner posts 21 and extend therebelow so as to engage the flat-bed container corner post 76, as most clearly shown in FIGS. 3 and 6. Normally only two guides 80 are provided, one at each end of a longitudinal member 18, for properly aligning the spreader extension 10 with the container 14.

In operation, as the crane lowers spreader bar 12 over the spreader bar extension 10, the tapered plates 36 at each corner of the extension 10 align the twist locks 38 and the post apertures 40 rapidly and efficiently because of the funneling characteristics of guide plates 36. Pins 32, maintained in a coupled position by safety pins 48, are inserted through aligned openings in bracket 28 and flange 42 for suspending the extension 10 beneath spreader bar 12. The coupled spreader bar and extension are then positioned above a container and lowered into contiguous relationship therewith for subsequent connection thereto. The spreader operator will lower the spreader bar extension 10, suspended beneath spreader bar 12, so that the bottom of the guides 80 are below the top of the container corner posts 76 but high enough for the locking lugs 62 to clear the posts 76. The operator then moves the spreader and spreader bar extension laterally until guides 80 engage posts 76. The extension 10 is overtraveled slightly and then lowered so that the two guides 80 align all four spreader extension locking lugs 62 with locking apertures, not shown, provided in each upper end of container corner post 76. Thus, the alignment of the extension 10 with the flat-bed container 14 is effectively made by using only two guides 80. Subsequent rotation of the spreader bar locking lugs 38 will result in concomitant rotation of the extension locking lugs 62 thus coupling the lug to the spreader bar.

Thus it can be seen that with the locking lugs in the locked position, the load is supported by corner posts 21 and the spreader bar 12. With the lugs in the unlocked position, the extension 10 is supported from the spreader bar 12 by locking pins 32.

Any number of configurations may be given to guide plates 36, 82, so long as the guides function to align the extension with the load and the spreader bar.

While the preferred embodiment of the present invention illustrates the use of guides at all four upper corners and two of the lower corners, it will be obvious that the same principles of operation can be applied for in connection with spreader bars and loads having various configurations. and in some instances only one guide or two guides would be necessary for positioning the extension with respect to a load and a spreader, respectively.

We claim:

1. A spreader bar extension for a crane carried lifting spreader bar used in transferring large bulky loads comprising: a framework having vertically depending, elongated support members for extending between a spreader bar and a load to be transferred, guide means secured to said framework for aligning said framework with a spreader bar and a load to be transferred, and coupling means positioned on said framework for receiving in coupled relation spreader bar locking lugs, said coupling means including locking lugs located at the lowermost ends of said elongated support members, and means for interconnecting the spreader bar locking lugs with said coupling means locking lugs for actuating said coupling means locking lugs for securing said framework to a load to be transferred upon actuation of the spreader bar locking lugs.

2. The spreader bar extension of claim 1, wherein said guide means includes tapered guide plates positioned at the upper and lower extremities of said framework 3. The spreader bar extension of claim 2, wherein said framework support members includes hollow posts, said means interconnecting the spreader bar locking lugs with said coupling means locking lugs being located within said hollow posts.

4. The spreader bar extension of claim 1, wherein said framework coupling means substantially corresponds in size to the spreader bar and further includes locking means for releasably securing said framework to the spreader bar.

5. The spreader bar extension of claim 3 said means interconnecing the spreader bar locking lugs and the coupling means locking lugs including a member rotatably mounted within one of said posts having means for receiving a spreader bar locking lug within the upper end thereof and for supporting a framework coupling means locking lug at the lower end thereof, whereby the spreader bar locking lug and said framework locking lug rotate concomitantly between locked and unlocked positions.

6. The spreader bar extension of claim 5, wherein said tapered guide plates are secured to the upper end of at least one post for facilitating registry of said framework coupling means with a spreader bar locking lug.

7. The spreader bar extension of claim 6, wherein said tapered guide plates are secured to the lower end portion of at least one of said posts for facilitating registry of said framework coupling means locking lug with a load having load receiving couplings thereon.

8. The spreader bar extension of claim 7, and further including means for releasably securing said framework to the spreader bar when said framework locking lugs are in an unlocked position.

9. The spreader bar extension of claim 8, wherein said framework is a generally rectangular and said posts are secured at each of the four corners of said framework.

10. The spreader bar extension of claim 9, wherein said guide means are secured to the upper end of each of said posts and to the lower end of at least one of said posts.

* * * * *